April 29, 1924.
H. BOGATY
1,492,418
DRYING APPARATUS
Filed April 18, 1922    2 Sheets-Sheet 2
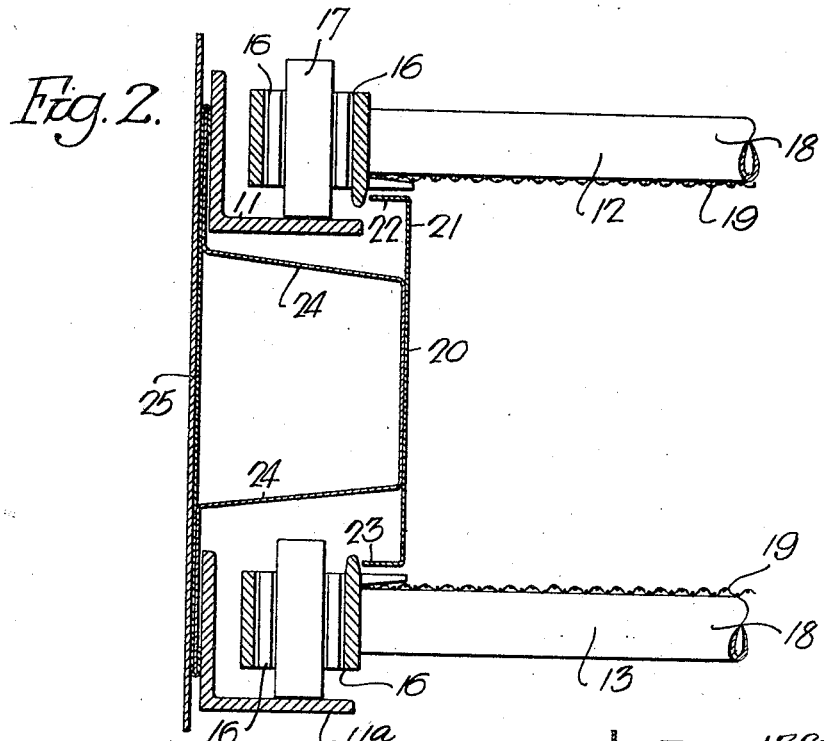
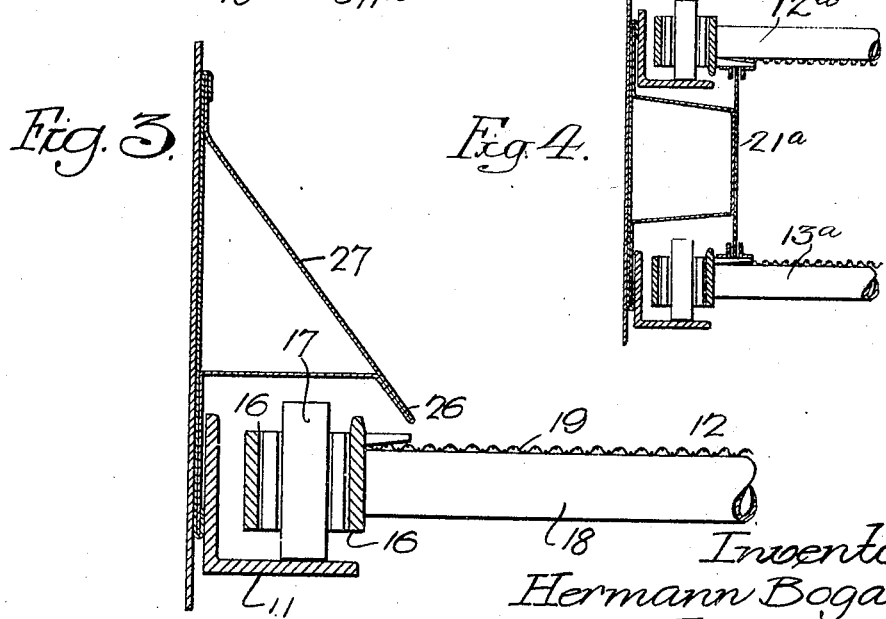
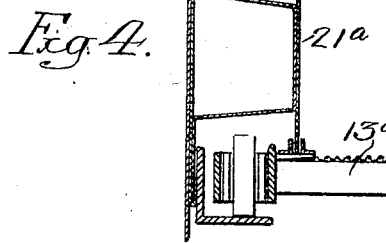

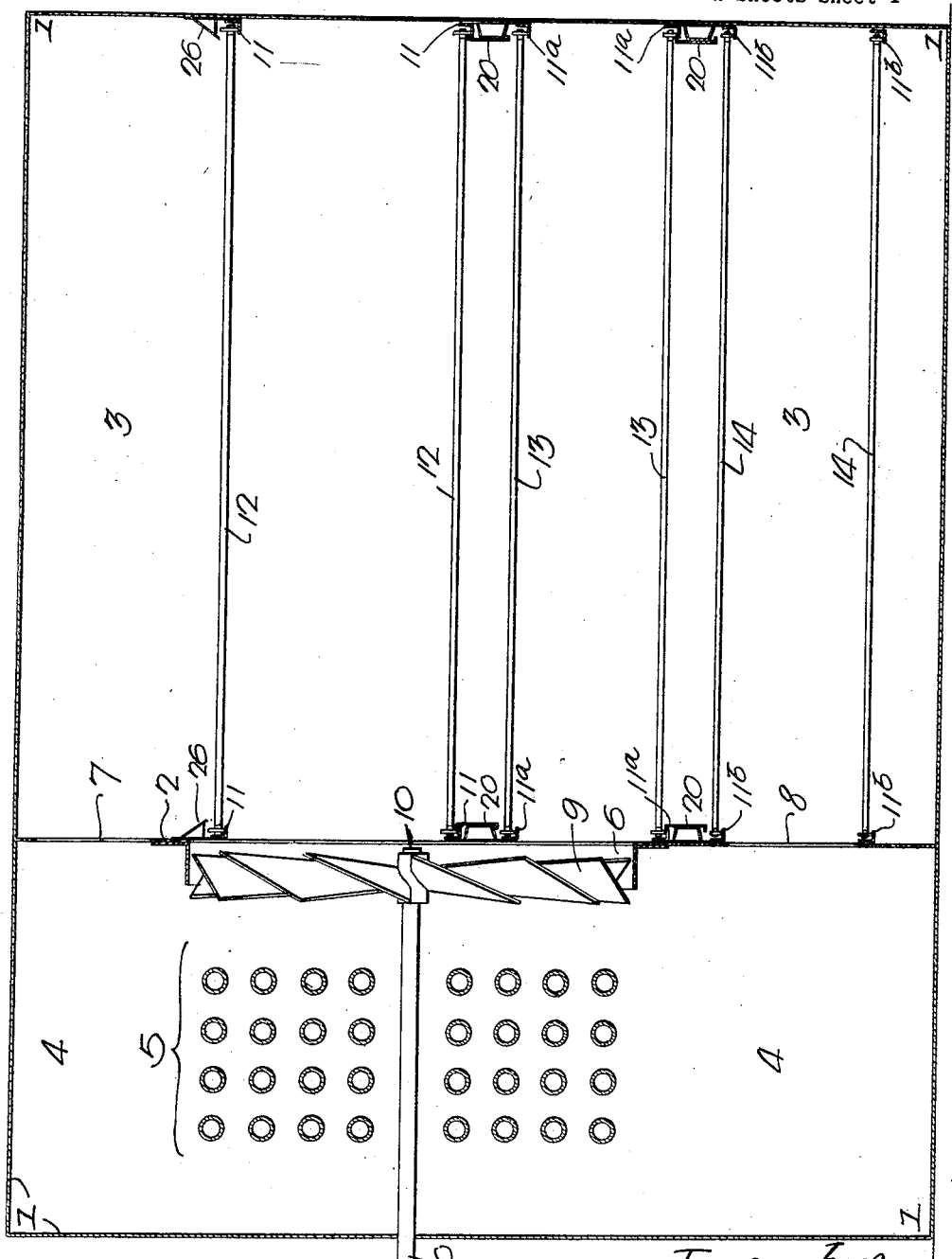

Patented Apr. 29, 1924.

1,492,418

UNITED STATES PATENT OFFICE.

HERMANN BOGATY, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

DRYING APPARATUS.

Application filed April 18, 1922. Serial No. 554,365.

*To all whom it may concern:*

Be it known that I, HERMANN BOGATY, a citizen of the United States, residing in Philadelphia, Pennsylvania, have invented certain Improvements in Drying Apparatus, of which the following is a specification.

My invention relates to certain improvements in drying apparatus of the type in which material to be dried is carried on conveyers through a drying compartment, the conveyers being located—one above another—in the drying compartment.

In the above type of drier, the air is circulated by means of fans located at the side of the drying compartment.

The object of my invention is to prevent the material carried by the conveyers from being blown, or drawn away from the conveyer aprons. This object is attained by providing baffles at the side of the conveyers. In the three conveyer type, these baffles extend from the carrying run of one conveyer to the return run of the conveyer directly above it.

In the accompanying drawings:

Fig. 1 is a transverse sectional view of a drying apparatus of the three conveyer type, illustrating my invention; Figs. 2 and 3 are enlarged sectional views of the baffles; and Fig. 4 is a view of a modification.

1 is the casing of a drying apparatus. 2 is a longitudinal partition separating the drying compartment 3 from the heating compartment 4. In the latter compartment are heating pipes 5. The partition 2 has fan openings 6 and circulating passages 7 and 8. In the fan openings 6 are circulating fans 9 mounted on horizontal shafts 10, adapted to suitable bearings and extending outside of the drier. The shafts 10 can be driven in any manner desired.

11, 11$^a$ and 11$^b$ are longitudinal rails of angle iron located in the drying compartment. The rails are preferably spaced as shown so as to carry the conveyers 12, 13 and 14, respectively. Each conveyer consists of side chains 16 having rollers 17, which travel on the rails; cross bars 18 and aprons 19, which are perforated to allow air to pass through the aprons and the material carried thereby.

The lower run of the upper conveyer 12 is located close to the carrying run of the intermediate conveyer 13. The lower run of the intermediate conveyer is located close to the carrying run of the lower conveyer 14. The lower, or return, runs of the conveyer tend to retain the material on the carrying runs, but, when the air is in circulation, the material will be blown, or drawn away from the carrying runs at the sides of the conveyer. In order to prevent this, baffles 20 are provided at each side of the drying compartment, as shown in Figs. 1 and 2. The baffles consist of sheet iron guard plates 21, which extend substantially the full length of the conveyers. These baffles are flanged at the upper and lower edges, as at 22 and 23. The flanges extend close to and parallel with the fittings of the chains.

The guard plates 21 are supported by box-like structures 24 of sheet metal having back plates 25. These structures, in connection with the rails of the carrying runs, prevent the material being dried escaping from the sides of the conveyers. The baffles are held in place by the rails, as shown in Fig. 2.

Baffles 26 for the carrying runs of the upper conveyer 12 are made as shown in Fig. 3. Each baffle is made in the form of a box, triangular in cross section.

27 is an inclined guard extending over the chains of the conveyers and close to the aprons. A flange of the box extends back of the rail 11 and is secured to the fixed portion of the drier. The chains are free to travel on the rails under the guards.

By the construction hereinbefore described, the air can be circulated rapidly without injury to the material being dried, as the lower runs of the conveyers retain the material on the carrying runs when the air currents are upwards and the baffles retain the material at the sides of the conveyers.

Fig. 4 illustrates a modification of the invention, in which a guard plate 21$^a$ extends into grooves formed by angle plates 28 carried by the conveyers 12$^a$ and 13$^a$.

I claim:

1. The combination in a drying apparatus, of a drying compartment; means for circulating heated air in said compartment; rails at each side of the compartment; two or more conveyers, each conveyer having a chain at each side arranged to travel on the rails, one conveyer being located above another; and guard plates at the edges of the carrying portions of the conveyer, located inside of the line of the chains and extending from the surface of the carrying run of one conveyer to the surface of the return run of another conveyer so as to prevent the air in circulation from blowing or drawing the material away from the conveyer apron.

2. The combination in a drying apparatus, of a casing enclosing a drying compartment and a heating compartment; a partition separating the compartments; circulating fans in the partition; three conveyers in the drying compartment, one located above another, the return run of the upper conveyer being close to the carrying run of the intermediate conveyer, and the return run of the intermediate conveyer being close to the carrying run of the lower conveyer; and box-like baffles at the edges of the carrying runs of the conveyers which prevent the escape of material being dried.

3. The combination in a drying apparatus, of a casing; two rails therein, one located above the other; two chain conveyers having wheels adapted to travel on said rails; and a box-like baffle located between the rails and having a guard plate extending close to the conveyer at a point within the line of the rails.

4. The combination in a drying apparatus, of a drying compartment; rails therein; two or more chain conveyers in said compartment, one conveyer being located above another conveyer; chains at each side of each conveyer having wheels traveling on the rails; fixed guard plates at each side of the drying compartment and located between the carrying run of one conveyer and the return run of another conveyer inside the line of the chains and extending beyond the edges of the chains so as to prevent material being dried from escaping at the sides of the carrying run of the conveyer; and means for circulating air in the drying chamber.

HERMANN BOGATY.